US008863203B2

(12) United States Patent
Tsuji

(10) Patent No.: US 8,863,203 B2
(45) Date of Patent: Oct. 14, 2014

(54) VIDEO SERVER APPARATUS

(75) Inventor: Kiyotaka Tsuji, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 538 days.

(21) Appl. No.: 12/700,007

(22) Filed: Feb. 4, 2010

(65) Prior Publication Data

US 2010/0235873 A1    Sep. 16, 2010

(30) Foreign Application Priority Data

Mar. 13, 2009  (JP) ................................. 2009-061645

(51) Int. Cl.
| | | |
|---|---|---|
| H04N 7/173 | (2011.01) |
| H04N 21/2312 | (2011.01) |
| H04N 19/102 | (2014.01) |
| H04N 21/2183 | (2011.01) |
| H04N 21/235 | (2011.01) |
| H04N 21/231 | (2011.01) |

(52) U.S. Cl.
CPC ....... *H04N 21/2312* (2013.01); *H04N 7/26074* (2013.01); *H04N 21/2183* (2013.01); *H04N 7/17336* (2013.01); *H04N 21/235* (2013.01); *H04N 21/23106* (2013.01)
USPC .............................. 725/91; 725/109; 725/114

(58) Field of Classification Search
None
See application file for complete search history.

(56) References Cited

U.S. PATENT DOCUMENTS

| | | | | |
|---|---|---|---|---|
| 5,487,035 A | * | 1/1996 | Nishimura et al. | 365/189.02 |
| 5,517,502 A | * | 5/1996 | Bestler et al. | 370/449 |
| 5,612,742 A | * | 3/1997 | Krause et al. | 375/240.25 |
| 5,640,194 A | * | 6/1997 | Suzuki et al. | 725/92 |
| 5,745,837 A | * | 4/1998 | Fuhrmann | 725/114 |
| 5,790,176 A | * | 8/1998 | Craig | 725/115 |
| 5,815,146 A | * | 9/1998 | Youden et al. | 715/720 |
| 5,867,764 A | * | 2/1999 | Williams | 725/125 |
| 5,892,535 A | * | 4/1999 | Allen et al. | 725/36 |
| 5,963,557 A | * | 10/1999 | Eng | 370/432 |

(Continued)

FOREIGN PATENT DOCUMENTS

| | | |
|---|---|---|
| JP | 03-265392 | 11/1991 |
| JP | 2000-333152 | 11/2000 |

(Continued)

OTHER PUBLICATIONS

Notice of Reasons for Rejection issued by the Japanese Patent Office in Japanese Patent Application No. 2009-061645, mailed Jan. 4, 2011, (3 pages total).

*Primary Examiner* — Brian T Pendleton
*Assistant Examiner* — Jonathan V Lewis
(74) *Attorney, Agent, or Firm* — Finnegan, Henderson, Farabow, Garrett & Dunner, LLP

(57) ABSTRACT

A video server apparatus includes an interface unit configured to receive a video data file, memory units configured to store data files received by the interface unit, a line concentrator configured to receive the data files retrieved from the memory units and packetized, decoders configured to decode a packetized data file transmitted from the line concentrator and to output video data, a switch configured to switch signal paths between the line concentrator and the decoders, a data transmission controller configured to control data transmission by packet transmission over a standardized general-purpose local area network among the interface unit, the memory units, the line concentrator, the switch, and the decoders, and a timing controller configured to generate time slots for the memory units and causes a packetized data file to be transmitted from at least one of the memory units within a corresponding time slot to the line concentrator.

4 Claims, 3 Drawing Sheets

(56) References Cited

U.S. PATENT DOCUMENTS

| | | | |
|---|---|---|---|
| 6,085,238 A * | 7/2000 | Yuasa et al. | 709/223 |
| 6,163,795 A * | 12/2000 | Kikinis | 709/203 |
| 6,249,526 B1 * | 6/2001 | Loukianov | 370/442 |
| 6,714,968 B1 * | 3/2004 | Prust | 709/219 |
| 7,499,982 B2 * | 3/2009 | Yoshimine et al. | 709/219 |
| 7,512,697 B2 * | 3/2009 | Lassen et al. | 709/230 |
| 7,590,998 B2 * | 9/2009 | Hanley | 725/112 |
| 2001/0013123 A1 * | 8/2001 | Freeman et al. | 725/34 |
| 2002/0138845 A1 * | 9/2002 | Hoang | 725/90 |
| 2003/0093798 A1 * | 5/2003 | Rogerson | 725/75 |
| 2003/0225835 A1 * | 12/2003 | Klien et al. | 709/205 |
| 2004/0128701 A1 * | 7/2004 | Kaneko et al. | 725/136 |
| 2007/0081541 A1 * | 4/2007 | Umekage et al. | 370/395.2 |
| 2007/0220562 A1 * | 9/2007 | Janssen et al. | 725/81 |
| 2009/0007192 A1 * | 1/2009 | Singh | 725/75 |

FOREIGN PATENT DOCUMENTS

| | | |
|---|---|---|
| JP | 2001-186411 | 7/2001 |
| JP | 2003-143095 | 5/2003 |
| JP | 2004-159154 | 6/2004 |
| JP | 2005-045768 | 2/2005 |
| JP | 2007-166047 | 6/2007 |
| JP | 2008-059096 | 3/2008 |
| JP | 2008-113347 | 5/2008 |

* cited by examiner

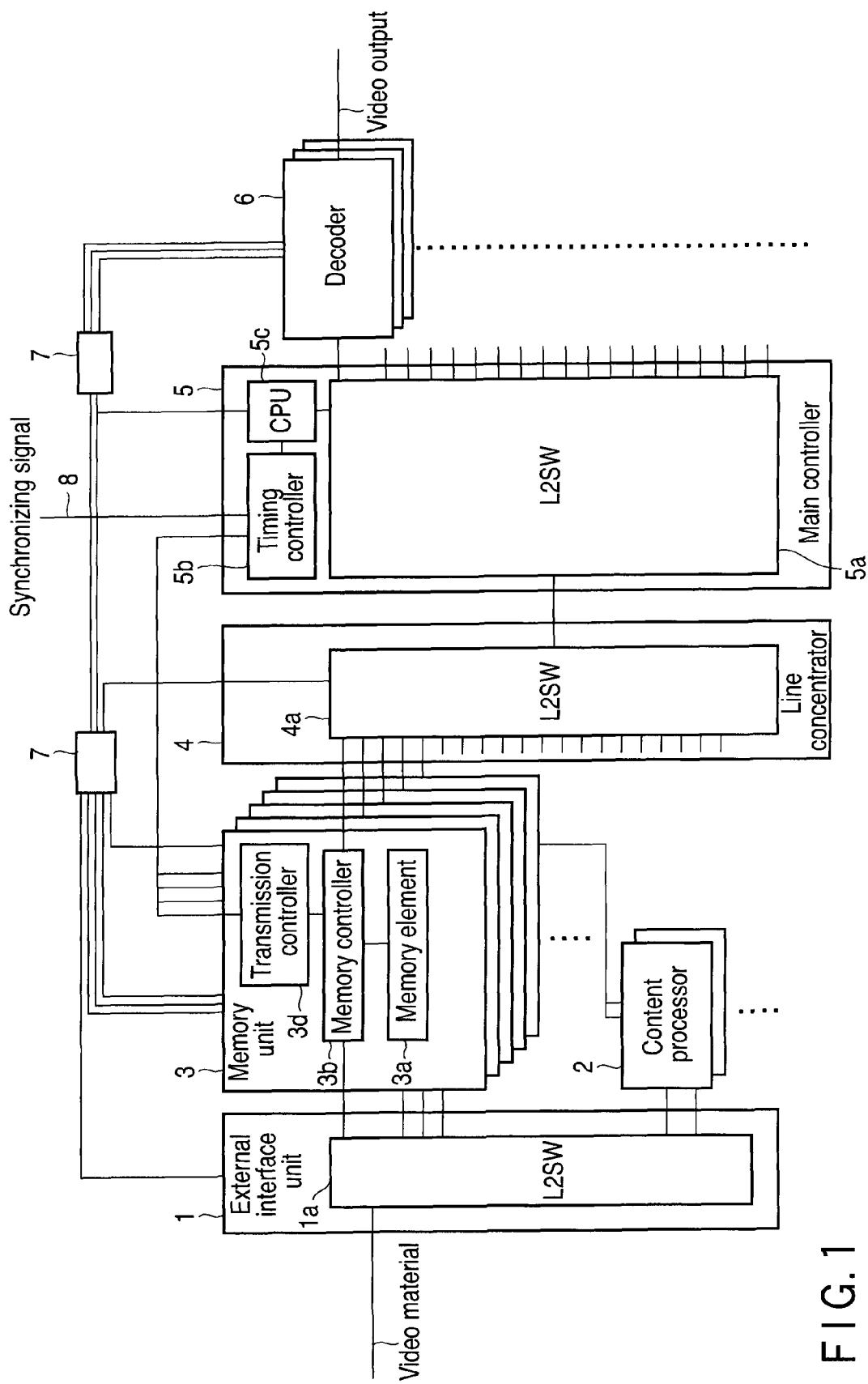
F I G. 1

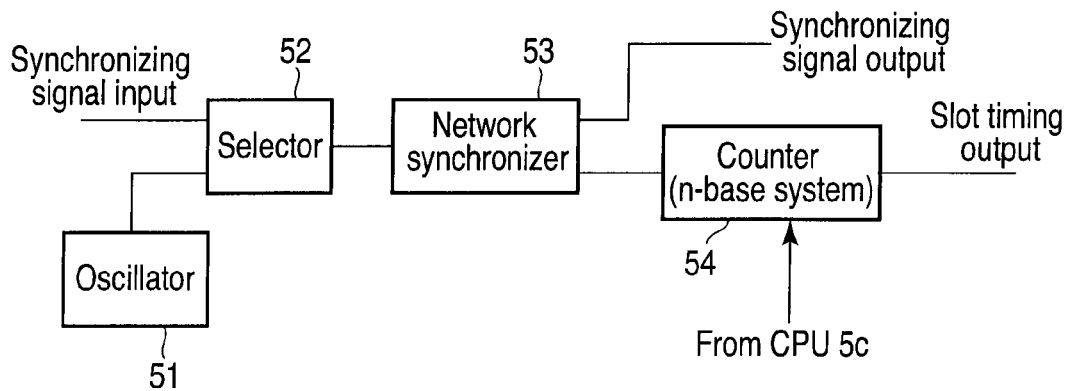
F I G. 2
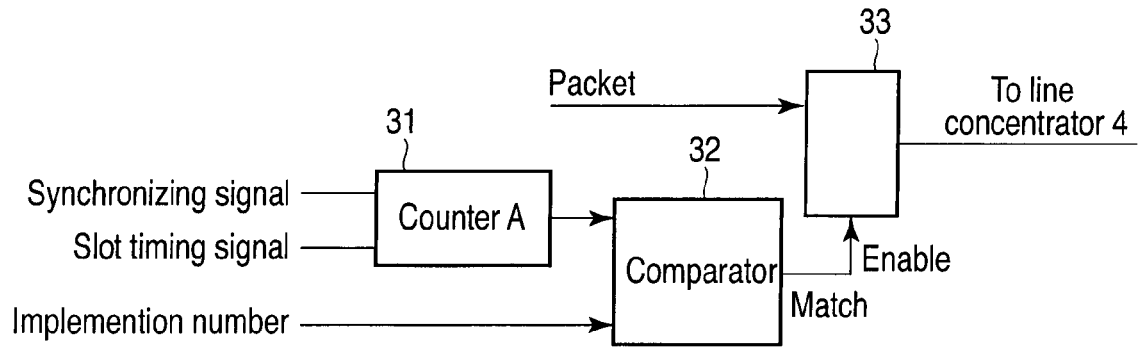
F I G. 3

VIDEO SERVER APPARATUS

CROSS-REFERENCE TO RELATED APPLICATIONS

This application is based upon and claims the benefit of priority from prior Japanese Patent Application No. 2009-061645, filed Mar. 13, 2009, the entire contents of which are incorporated herein by reference.

BACKGROUND OF THE INVENTION

1. Field of the Invention

The present invention relates to a video server apparatus provided in a broadcast station.

2. Description of the Related Art

In general, a video server is provided in a broadcast station or an image distribution system to store image data which has been edited or recorded (disclosed in Jpn. Pat. Appln. KOKAI Publication No. 2001-186411 and Jpn. Pat. Appln. KOKAI Publication No. 2008-59096, for example). A common computer that is configured on the basis of established computer architecture is developed with an enlarged memory capacity and a high-speed central processing unit (CPU) to provide the video server function. Therefore, the expendability of the video server is limited within the existing architecture. For example, the general video server employs an internal bus having unique specifications which are established based upon a 128-bit parallel bus. Thus, speeding up the signal transmission is limited in consequence of various noises. When the video server utilizes a shared bus, tolerance to electric load is also limited. Thus, the expendability of the system is further limited. In addition, it is required to design an own protocol for each of boards including a memory board to be inserted to a slot. A period of time for designing the protocol may be prolonged.

In some cases, the conventional video server may employ an internal control system which is unique to a vender of the video server, or the conventional video server may employ a low-speed transmission system such as a serial transmission system. If the data transmission speed in the system is slow, a processing performance is reduced and the video server can not be further expanded. If the video server, which employs the unique system as the internal control system, can be connected to the Internet Protocol (IP) network, protocol exchange is required and the response speed is slowed down.

As the existing video server has the limited expendability and period of time for the protocol design is prolonged, addressing such problems is desired. In addition, a medium which is used for delivering video materials is shifted from films and tapes to data files. Techniques to comply with such shifting are also desired.

BRIEF SUMMARY OF THE INVENTION

It is an object of the present invention to provide a vide server apparatus in which data transmission is executed at high speed, and processing performance and expandability is improved.

According to an embodiment of the present invention, a video server apparatus comprises:

an interface unit configured to receive a video data file;

memory units configured to store data files received by the interface unit;

a line concentrator configured to receive the data files which are retrieved from the memory units and packetized;

decoders configured to decode a packetized data file transmitted from the line concentrator and to output video data;

a switch configured to switch signal paths between the line concentrator and the decoders;

a data transmission controller configured to control data transmission by packet transmission over a standardized general-purpose local area network among the interface unit, the memory units, the line concentrator, the switch, and the decoders; and a timing controller configured to generate time slots for the memory units and causes a packetized data file to be transmitted from at least one of the memory units within a corresponding time slot to the line concentrator.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention.

FIG. 1 is a functional block diagram showing a video server according to an embodiment of a video server.

FIG. 2 is a functional block diagram showing an example of a timing controller of the video server.

FIG. 3 is a functional block diagram showing an example of transmission controller of a memory unit in the video server.

DETAILED DESCRIPTION OF THE INVENTION

Figure 4:
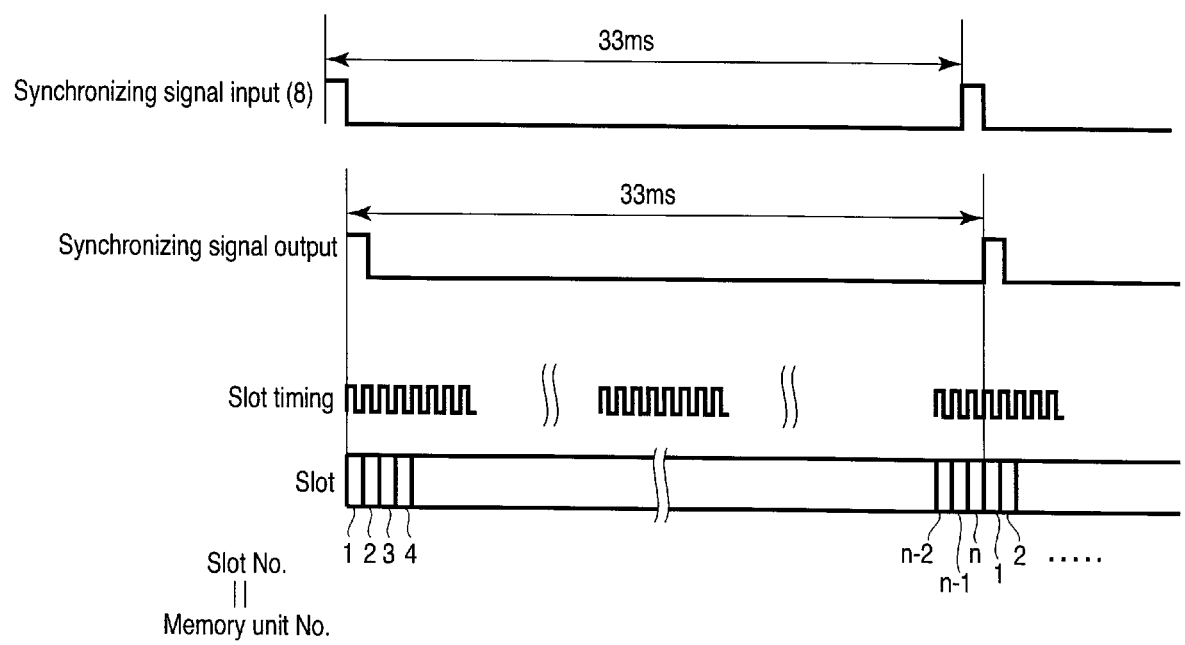
FIG. 4 is a timing chart showing timings at which the memory units transmit packets to line concentrator.

An embodiment of a video server apparatus according to the present invention will now be described with reference to the accompanying drawings.

FIG. 1 is a functional block diagram showing a configuration of a video server according to an embodiment of the invention. The video server may also function as a transmission server and an editing server.

As shown in FIG. 1, a data file of a video material enters in the vide server, and an external interface (I/F) unit 1 receives the data file. The external I/F unit 1 includes a layer 2 switch (L2SW) 1*a*. The L2SW 1*a* is connected to memory units 3 and content processors 2. The data file is transmitted to either of the content processors 2, and the content processor 2 conducts negotiation with the memory units 3 to determine a memory unit 3 which is to store the data file. The content processor 2 transmits the data file to the memory unit 3 which is determined to store the data file. In specific, when the video server functions as the transmission server, the content processor 2 checks an attribute of the data file and, based on the check result (data size and the like), determines a decoder unit 6 to which the data file is transmitted. At the time of determining the decoder unit 6, the content processor 2 refers to a database (not shown) which is provided in a main controller 5.

The data file transmitted to the memory unit 3 is stored in a memory element 3*a* and, if necessary, retrieved from the memory element 3*a*. The retrieved data file is packetized and transmitted to a layer 2 switch 4a in a line concentrator 4. Packet transmission lines from the memory units 3 are concentrated in the line concentrator 4 having an output port that is connected to a layer 2 switch 5a of the main controller 5. The layer 2 switch 5a in the main controller 5 sorts the packets and outputs the packets to low speed ports. The packets are transmitted to the decoders 6. The decoder 6 extracts video data (MPEG2 transport stream) from the packet, decodes the video data to generate a video output, and outputs the video output. When the video server functions as the editing server, the data file retrieved from the memory unit 3 turns back to the external I/F unit 1 to be output from the external I/F unit 1.

The external I/F unit 1, the content processors 2, the memory units 3, the line concentrator 4, and the decoders 6 are connected to the main controller 5 via a control Ethernet (registered trademark) network using Ethernet switches 7 and operate under the control of the main controller 5. Data transmission inside the video server is executed based on 10 Gbps Ethernet via the Ethernet switches 7, for example. Data output from the external I/F unit 1 or the main controller 5 may be executed based on 1 Gbps to 10 Gbps Ethernet. As the Ethernet switches 7 are employed for connection with the main controller 5, the control signals of the video server can be transmitted over the control Ethernet network. The main controller 5 includes a CPU 5c. The CPU 5c controls operations in the video server. Employing the Ethernet network for control system allows use of a general-purpose protocol on the Ethernet. Thus, remote control from an external device can be readily conducted.

Each of the memory units 3 includes, in addition to the memory element 3a, a memory controller 3b and a transmission controller 3d. The main controller 5 includes a timing controller 5b which controls data transmission timing between the layer 2 switch 5a and the memory units 3.

FIG. 2 is a functional block diagram showing a configuration of the timing controller 5b according to an embodiment. The timing controller 5b receives an external synchronizing signal 8 for network synchronization. The synchronizing signal and an internal clock from an oscillator 51 are selectively output from a selector 52. A clock output from the selector 52 passes through a network synchronizer 53 and reaches a counter 54. Under the control of the CPU 5c in the main controller 5, the number "n" of boards of the memory units 3 is set in the counter 54. The counter 54 operates as an n-base counter. Thus, a slot timing signal is output to generate a time slot signal in correspondence with the number "n" of the boards of the memory units 3. The synchronizing signal is synchronized with the slot timing signal. The synchronizing signal is supplied to both of the memory units 3 and the decoders 6.

FIG. 3 is a functional block diagram showing a configuration of the transmission controller 3d of the memory unit 3 according to an embodiment. The synchronizing signal and the slot timing signal are supplied to a counter A 31. The counter A 31 measures time in synchronization with the synchronizing signal. A comparator 32 compares a counter value of the counter A 31 and an implementation number (or board number) of the memory unit 3. When the counter value matches the board number, a buffer 33 receives an enable signal. The buffer 33 has stored the packetized data file, and in response to the enable signal, outputs the packetized data file to the line concentrator 4. The number "n" of the memory units 3 is stored in the main controller 5 at the time of initial setting of the system.

FIG. 4 is a timing chart showing timings for transmitting packets from the memory units 3 to the line concentrator 4. In the present embodiment, the video server employs the Ethernet connection as an internal connection system, and video data is packetized and transmitted. Thus, the IP network can be readily utilized; however, it is required to address asynchronous transmission of the packets.

That is, when a packet is supplied to the line concentrator 4 out of synchronization and is output from the one output port of the concentrator 4, congestion may occur to cause a packet loss. To avoid such packet loss, time points (or timing) to output data from the memory units 3 are controlled in the present embodiment. To be specific, a predetermined period (33 ms, for example) defined by the synchronizing signal which is output from the network synchronizer 53 is divided into n time slots in correspondence with the slot timing signal. Here, the number "n" is equal to the number of the memory units 3. The packets are output in order of the implementation number of the memory units 3.

In FIG. 4, the synchronizing signal (8) inputting to the timing controller 5b provides a time interval of 33 ms. The time interval of 33 ms corresponds to a basic period of image data. In the present embodiment, retrieving image data from the memory units 3 is evenly performed at the time intervals, and the data is transmitted to the decoders 6 at intervals of 33 ms. The number of the time slots generated in the period is set to be equal to the number "n" of the memory units 3, in the present embodiment. The number of the memory units 3 is set at the time of initial setting of the vide server. Based on the set number, a time slot is assigned to one memory unit 3. Each of the memory units 3 transmits the packet within the corresponding time slot. Accordingly, packet transmission can be performed without congestion in neither of the layer 2 switch 4a in the line concentrator 4a nor the layer 2 switch 5a in the main controller 5.

As described above, in the present embodiment, internal data transmission in the video server apparatus is realized with packet transmission over the Ethernet (registered trademark). Retrieving timing of the data from a memory unit is controlled to accord with a time slot corresponding to the implementation number of the memory unit. Therefore, congestion in the line concentrator 4 is avoided and the packet loss is prevented from occurring. In addition, advantage of the packet transmission can be utilized. Consequently, data transmission in the video server apparatus can be speeded up, processing performance can be improved and expandability of the video server apparatus can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video server apparatus comprising:
an interface unit configured to receive video data files;
memory units configured to store the video data files received by the interface unit;
a line concentrator configured to receive data files which are retrieved from the memory units and packetized;
decoders configured to decode a packetized data file transmitted from the line concentrator and to output video data;
a switch configured to switch signal paths between the line concentrator and the decoders;
a data transmission controller configured to control data transmission by packet transmission over a standardized general-purpose local area network among the interface unit, the memory units, the line concentrator, the switch, and the decoders; and a timing controller configured to:
  generate time slots for the memory units based on a supplied synchronizing signal and the number of the memory units in correspondence with implementation numbers of the memory units, the number of the time slots being equal to the number of memory units, the number of memory units set at a time of initial setting of the video server, and
  cause a packetized data file to be transmitted from at least one of the memory units within a corresponding time slot to the line concentrator.

2. The video server apparatus of claim 1, further comprising a content processor configured to determine at least one of the memory units to store the video data file based on a content attribute of the video data file.

3. The video server apparatus of claim 1, wherein the general purpose local area network includes an Ethernet network.

4. The video server apparatus of claim 1, wherein the interface unit is configured to output a data file stored in at least one of the memory units.

* * * * *